April 15, 1924.
P. H. GASKINS
LUBRICATING SYSTEM
Filed Feb. 11, 1922
1,490,818
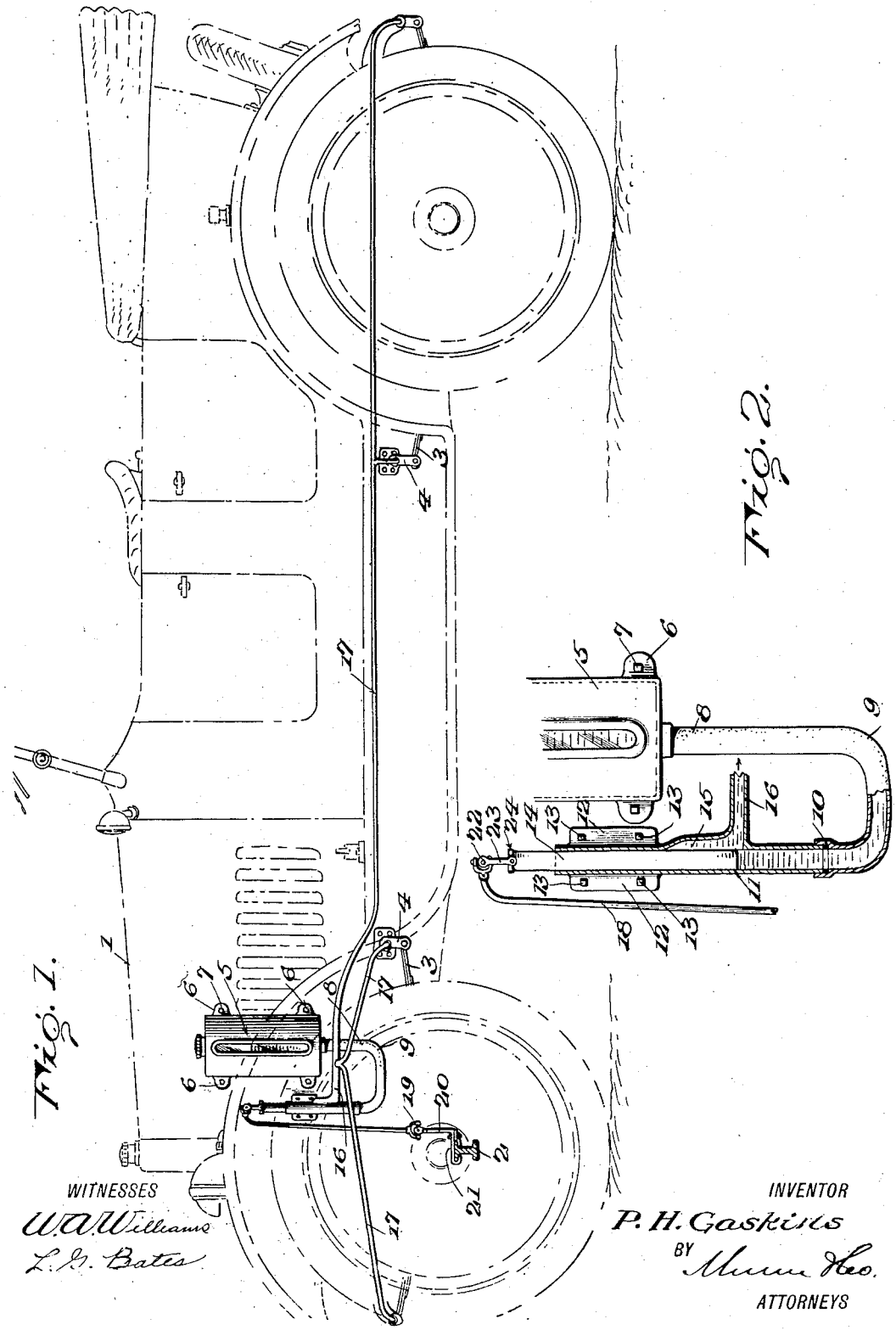

Patented Apr. 15, 1924.

1,490,818

UNITED STATES PATENT OFFICE.

PALEMON H. GASKINS, OF JACKSONVILLE, FLORIDA.

LUBRICATING SYSTEM.

Application filed February 11, 1922. Serial No. 535,857.

*To all whom it may concern:*

Be it known that I, PALEMON H. GASKINS, a citizen of the United States, and a resident of Jacksonville, in the county of Duval and State of Florida, have invented certain new and useful Improvements in Lubricating Systems, of which the following is a specification.

My invention relates generally to lubricating systems, more particularly to lubricating systems adapted for application to motor vehicles, and consists in the combinations, constructions and arrangements herein described and claimed.

An object of my invention is to provide a lubricating system adapted to be controlled by the motion of a flexibly supported member to control the flow of a lubricant therethrough.

A further object of my invention is to provide a lubricating system which is adapted to be applied to a vehicle provided with a spring supported for flexure and controlled by the flexure of the spring, whereby the flow of a lubricant through the system varies directly in proportion to the flexing of the spring.

A still further object of my invention is to provide a lubricating system which is adapted to be applied to a vehicle to supply a lubricant to the relatively moving parts of the vehicle and which comprises a novel means for controlling the flow of the lubricant therethrough.

Other objects and advantages will be apparent from the following description, and the novel features of the invention will be particularly outlined in the appended claims.

My invention is illustrated in the accompanying drawings, forming a part of this application, in which, Figure 1 is a view showing more or less diagrammatically a vehicle equipped with my invention, and Figure 2 is an enlarged view partly in vertical section and partly in side elevation of a fragmentary portion of the structure comprised in my improved lubricating system.

In Figure 1, I show more or less diagrammatically an automobile which is of conventional construction and comprises a body designated generally at 1, which is mounted upon wheel-supported axles 2 by means of the usual springs, such as indicated at 3. Any suitable known form of spring mounting may be incorporated in a vehicle equipped with my invention and spring shackles, such as indicated at 4 may be comprised therein.

The parts described so far are ordinary in construction and form no part of my invention except in so far as they co-operate with the parts which will now be described. In carrying my invention into effect I provide a suitable reservoir or container 5 which is adapted to contain a lubricating fluid and is provided with lugs 6, whereby it may be secured by bolts 7 or the like to the body 1 and supported substantially in vertical position. The reservoir or container 5 is positioned above and preferably adjacent to one of the springs 3 of the vehicle, which in the present instance is one of the front springs thereof. The reservoir or container 5 is in open communication at its lower end with a supply tube 8 which depends therebelow for a predetermined distance, and is turned laterally at 9 and then upwardly adjacent to its extremity. The supply tube 8 is formed integrally at its up-turned end with a pipe connection 10 in which the lower end of a vertical cylinder 11 is disposed and with which the vertical cylinder has a fluid-tight fit.

The cylinder 11 and the supply tube 8 are substantially equal diametrically for a purpose which will be hereinafter set forth. The cylinder 11 is provided with laterally extending lugs 12 adjacent to its upper end which are secured by bolts 13 or the like to the body 1, whereby the cylinder is held against movement relatively to the body. A plunger 14 which is practically equal in length to the cylinder 11 is reciprocatively disposed therein and controls a vertically elongated port 15 which extends laterally of the cylinder intermediately of its length and communicates with a delivery tube 16 leading from the lower end thereof. The delivery tube 16 is divided into branch delivery tubes, such as those indicated at 17, which lead to the parts of the vehicle to which a lubricant is to be supplied, as for instance, to the spring shackles 4.

It is to be observed at this point that the reservoir or container 5 is positioned at a higher level than the upper end of the port 15 and at a higher level than the parts of the vehicle to which the lubricant is to be supplied, whereby the lubricant from the reservoir 5 will normally be fed by gravity to the parts with which the branch delivery tubes 17 are connected so long as the port 15 is open. Moreover, the flow of a lubricant through the port 15 will vary in proportion to the raising or elevation of the plunger 14 from position to close the port 15.

It is desirable that the means for operating the plunger 14 to control the port 15 should be automatic so that lubricant will be permitted to flow through the port 15 when the vehicle is in motion and that the volume of the lubricant supplied to the parts of the vehicle to be lubricated shall be increased as the speed of the vehicle increases and also as the movements of the body 1 relatively to the axles 2 increase in extent. Moreover such means should be operated automatically to cause a cessation of flow through the port 15 to the delivery tubes when the vehicle is stopped. To this end, I provide means controlled by the flexure of the spring 3 to control the reciprocation vertically of the plunger 14. Such means comprises a pitman or operating rod 18 connected at its lower end by a universal joint 19 to the vertical arm 20 of a bracket 21 which is clamped to the axle 2. The pitman or operating rod 18 is turned laterally adjacent to its upper end and is connected by a universal joint 22 with a vertical link 23 which is pivotally attached at 24 to the plunger 14 at the upper end of the latter, the arrangement being such that the link 23 is capable of limited movements only about its pivot.

From the foregoing description of the various parts of the device, the operation thereof may be readily understood. A suitable lubricant, such as a standard lubricating oil, is placed in the reservoir 5 and will be forced by gravity therefrom into the supply pipe 8 to fill the latter to the plunger 14. When the vehicle 1 is not in motion, the body 1 and the axles 2 will remain in spaced relation and the plunger 14 will be retained in the position to close the port 15, thereby stopping the flow of lubricant to the delivery tube 16. When the vehicle 1 is propelled, the consequent flexure of the springs 3 as the body moves relatively to the axles 2 will determine the extent of movement of the plunger 14 in the cylinder 11 and will thus control the flow of lubricant through the port 15 and through the delivery tubes to the spring shackles or other bearings with which the supply tubes may be connected. As the vehicle is propelled at a greater speed or traverses a rough and uneven surface, the stroke of the plunger 14 will be longer since the movements of the body 1 relatively to the axles 2 will be of greater extent and the flow of lubricant through the port 15 will therefore vary in proportion to the flexing of the spring 3.

It is to be observed at this point that the plunger 14 operates during the down stroke thereof to force part of the lubricant which has entered the cylinder 11 and fills the latter above the lower end of the port 15 through the port 15 and the delivery tube 16 and through the supply tube 8 toward the container 5. Since the supply tube 8 and the cylinder 11 are substantially equal diametrically, the resistance to the plunger during its down stroke will be reduced to a minimum and will not occasion any undue strain upon the moving parts of the device.

Obviously, my invention is susceptible of embodiment in forms other than that in which illustrated in the accompanying drawings, and I therefore consider as my own all modifications and adaptations of the form of the device disclosed herein which fairly fall within the scope of the appended claims.

What I claim is:

1. The combination with a vehicle having an axle supported upon wheels, a body, and a spring mounting said body upon said axle, of a lubricating system comprising a vertical cylinder attached to said body, said cylinder being open at its lower and upper ends and being provided with a lateral port intermediately of its ends, a reservoir for a lubricant, said reservoir being supported upon said body above the level of the lateral port, a supply tube communicating with the lower end of said reservoir and with the lower end of said cylinder, a plunger reciprocatively disposed in said cylinder for controlling said port and normally positioned to close said port, and means connecting said plunger and said axle for reciprocating said plunger according to the flexure of said spring to permit varying quantities of lubricant to flow through the port.

2. In a lubricating system, a movably supported vertical cylinder, said cylinder being open at its upper and lower ends and being provided with a lateral port intermediately of its ends, a conduit communicatively connecting at one end with the lower end of said cylinder and extending above the level of said port, said conduit being adapted for connection at its upper end with a source of lubricant supply, the cross sectional areas of said cylinder and said conduit being approximately equal, a plunger reciprocatively disposed in said cylinder for controlling said port, and means movable relatively to said cylinder for controlling the reciprocation of said plunger to vary the flow of lubricant from said cylinder through said port.

3. In a lubricating system, a movably supported vertical cylinder, said cylinder being open at its upper and lower ends and being provided with a vertically elongated lateral port intermediately of its ends, a supply tube communicatively connected at one end with the lower end of said cylinder and extending above the level of the upper end of said port, said supply tube being adapted for connection at its upper end with a source of lubricant supply, the cross sectional areas of said cylinder and said supply tube being approximately equal, a plunger reciprocatively disposed in said cylinder for controlling said port and means movable relatively to said cylinder for controlling the reciprocation of said plunger in respect to said port to vary the flow of lubricant from said cylinder through said port.

PALEMON H. GASKINS.